US007933599B2

(12) United States Patent
Fernandez-Corbaton et al.

(10) Patent No.: US 7,933,599 B2
(45) Date of Patent: Apr. 26, 2011

(54) TECHNIQUES FOR FACILITATING COMMUNICATION HANDOFFS

(75) Inventors: Ivan Jesus Fernandez-Corbaton, Nuernber (DE); Jordi de los Pinos, San Diego, CA (US); Leonard Norman Schiff, San Diego, CA (US); Sherman A. Gregory, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1042 days.

(21) Appl. No.: 11/394,062

(22) Filed: Mar. 29, 2006

(65) Prior Publication Data
US 2006/0239238 A1 Oct. 26, 2006

Related U.S. Application Data

(60) Provisional application No. 60/666,331, filed on Mar. 29, 2005, provisional application No. 60/749,814, filed on Dec. 12, 2005.

(51) Int. Cl.
*H04W 36/00* (2009.01)

(52) U.S. Cl. .......... 455/436; 455/432.1; 455/67.16; 455/550

(58) Field of Classification Search ........... 455/436, 455/432.1, 12.1, 67.16, 550
See application file for complete search history.

(56) References Cited

U.S. PATENT DOCUMENTS

| | | | |
|---|---|---|---|
| 5,303,240 A | 4/1994 | Borras et al. | |
| 5,844,522 A | 12/1998 | Sheffer et al. | |
| 6,339,697 B1 * | 1/2002 | Ranta | 455/63.1 |
| 6,377,802 B1 * | 4/2002 | McKenna et al. | 455/430 |
| 6,768,913 B1 | 7/2004 | Molnar et al. | |
| 6,963,745 B2 | 11/2005 | Singh et al. | |
| 7,058,401 B1 | 6/2006 | Sinivaara et al. | |
| 2002/0137538 A1 | 9/2002 | Chen et al. | |
| 2002/0173269 A1 * | 11/2002 | Grayson et al. | 455/12.1 |

(Continued)

FOREIGN PATENT DOCUMENTS

DE 100 04 000 A1 8/2001

(Continued)

OTHER PUBLICATIONS

Korean OA dated Aug. 21, 2009, for US Application Serial No. 10-2007-7024776, 7 pages.

(Continued)

*Primary Examiner* — Charles N Appiah
*Assistant Examiner* — Kwasi Karikari
(74) *Attorney, Agent, or Firm* — Turocy & Watson, LLP (57) ABSTRACT

Various schemes are provided that facilitate a communication handoff from a current base station to a target base station. One feature provides for reducing the search space that a base station searches by providing it with the position/location and/or velocity of an access terminal with which it attempts to communicate. Having the position and/or velocity of the access terminal, a current or target base station is able to reduce its search space (e.g., direction, frequency range, and/or time window) for the access terminal. Another feature provides for selectively and gradually increasing the power of a pilot signal originating from the access terminal during the handoff acquisition period to a target base station. By increasing the pilot signal power, the base station has a better chance of acquiring the signal and do so more quickly.

20 Claims, 7 Drawing Sheets

U.S. PATENT DOCUMENTS

| | | |
|---|---|---|
| 2003/0069043 A1 | 4/2003 | Chhaochharia et al. |
| 2004/0174298 A1 | 9/2004 | Eriksson |
| 2004/0248519 A1* | 12/2004 | Niemela .................... 455/67.11 |
| 2005/0143118 A1* | 6/2005 | Bernhardsson et al. ...... 455/522 |
| 2005/0276247 A1 | 12/2005 | Heiman et al. |

FOREIGN PATENT DOCUMENTS

| | | |
|---|---|---|
| EP | 0932319 A | 7/1999 |
| EP | 1069706 A1 | 1/2001 |
| GB | 2393077 A | 3/2004 |
| WO | 96/08850 A | 3/1996 |

OTHER PUBLICATIONS

Argentina OA dated Feb. 11, 2010 for US Application Serial No. P 06 01 01233, 2 pages.

* cited by examiner

TECHNIQUES FOR FACILITATING COMMUNICATION HANDOFFS

CLAIM OF PRIORITY UNDER 35 U.S.C. §119

The present Application for Patent claims priority to Provisional Application No. 60/666,331 entitled "Techniques for Assisting Acquisition during Handoff" filed Mar. 29, 2005, and to Provisional Application No. 60/749,814 entitled "Techniques For Facilitating Communication Handoffs" filed Dec. 12, 2005, both of which are assigned to the assignee hereof and hereby expressly incorporated by reference herein.

REFERENCE TO CO-PENDING APPLICATIONS FOR PATENT

The present Application for Patent is related co-pending U.S. patent application Ser. No. 11/231,395 entitled "Doppler Compensation Scheme" filed on Sep. 20, 2005, to co-pending U.S. patent application Ser. No. 11/182,295 entitled "Communications Handoff Using An Adaptive Antenna" filed on Jul. 15, 2005, both of which are assigned to the assignee hereof.

BACKGROUND

1. Field

Various embodiments of the invention pertain to wireless communication systems. At least one embodiment of the invention pertains to a system and method of assisting in the acquisition of an access terminal by a target base station during a handoff.

2. Background

Wireless communication networks enable communication devices, such as access terminals, to transmit and/or receive information while on the move. These wireless communication networks may be communicatively coupled to other public or private networks to enable the transfer of information to and from the access terminals. Such communication networks typically include a plurality of base stations which provide wireless communication links to access terminals. The base stations may be stationary (e.g., fixed to the ground) or mobile (e.g., mounted on satellites, etc.) and positioned to provide wide area coverage as the access terminal travels across different coverage areas.

As an access terminal moves around, its communication link with a current base station may degrade. In this situation, the access terminal attempts to switch or connect with another base station for a better quality communication link while its current link is still active. This process of establishing a communication link with another base station is referred to as a "handoff." Soft handoffs and hard handoffs are two commonly used types of handoffs. A soft handoff is one where a new communication link with a new base station is established before the existing communication link is terminated. In a hard handoff, an existing communication link is typically terminated before a new communication link is established.

The handoff process typically encounters the problem of maintaining a reliable communication link with the wireless communication network while switching base stations. At some point during a soft handoff, a target base station attempts to acquire a "pilot" signal coming from an access terminal that is trying to switch the communication link from its current base station to a new target base station. One approach to acquiring an access terminal signal is to search for a known portion of its waveform. Thus, to assist with this demodulation and acquisition, a known signal, commonly referred to as a "pilot", is transmitted by the access terminal together with its information bearing signals.

The uplink (i.e., communication link from an access terminal to a base station) of many cellular communication systems employ Code Division Multiple Access (CDMA) as a means for simultaneously sharing the same frequency bandwidth among all the access terminal transmitting to a particular base station. Because of the non-orthogonal nature of CDMA, this multiplexing scheme relies on power control techniques devised to regulate the amount of interference that each individual transmission is causing to the rest of the access terminals being demodulated by a base station. Generally speaking, power control regulation has each access terminal transmit the minimum amount of power necessary to meet its grade of service (GOS) requirements. An access terminal communicating with a current base station minimizes its transmission power for a given communication performance level, which results in system resources being allocated more efficiently. In this manner, the interference caused to other access terminals is minimized and the overall system capacity is maximized.

Taking as a baseline a base station equipped with a single receiving antenna and simple digital processing that only attempts to implement a channel matched filter for each access terminal, a number of improvements are possible that increase uplink capacity with respect to such baseline. For instance, various forms of multiple antenna processing, uplink channel equalization, and interference cancellation may be implemented. As noted above, an increase in capacity can be achieved by a reduction of the access terminal's transmitted power needed to achieve a given grade of service when such techniques are in place. These enhancements are, in essence, more efficient ways of utilizing the power of the received signals in the demodulation and decoding process, resulting in a reduction of the needed power.

In their most simple and widely proposed forms, the capacity-improving techniques mentioned above are applied after the access terminal's pilot signal has been acquired. This causes a problem during the handoff process however. During a handoff, a target base station acquires an access terminal's pilot signal without the named performance enhancements. This means that the access terminal is transmitting a weaker pilot signal to the target base station during handoff, making it harder for the target base station to acquire the signal. This may impact the length of time it takes to acquire a signal.

SUMMARY

The techniques disclosed herein address the above stated needs by providing a more efficient communication system between a wireless access terminal and a plurality of base stations.

In one aspect, a method and apparatus for communications handoff may comprise one or a combination of the method or means for (a) obtaining location information for a communication device, (b) obtaining location information for a target base station attempting to acquire a signal from the communication device, (c) determining if a communication handoff from a current base station to the target base station is warranted, (d) determining a direction of the communication device relative to the target base station; (f) directing a directional antenna of the target base station in the direction of the communication device to reduce the search space for the signal from the communication device, (g) establishing a communication link between the target base station and the communication device, (h) acquiring the signal from the communication device, and/or (i) terminating a communication link between the current base station and the communication device. The communication device may be an access terminal mounted on an aircraft, and the method and apparatus may further include the method or means for: (a) determining a velocity of the communication device relative to the target base station, (b) determining the location of the communication device based upon calculations performed by a global positioning system receiver operatively associated with the communication device, and (c) adjusting the direction of the directional antenna to account for displacement of the communication device.

In another aspect, a method and apparatus for performing frequency offset compensation comprises method or means for: (a) determining a perceived carrier frequency of the communication device at the receiving target base station, and (b) adjusting the searched frequency range of the target base station to compensate for a frequency shift resulting from a Doppler shift of the transmitted carrier frequency from the communication device. An alternative method and apparatus for frequency offset compensation provides for method or means for: (a) determining a velocity of the communication device relative to the target base station, (b) determining a perceived carrier frequency of the communication device at the receiving target base station, and (c) modifying the transmitted carrier frequency of the communication device so that it arrives at the target base station at an expected nominal carrier frequency.

In some embodiments, a method operational on the communication device includes: (a) determining the propagation delay for transmission between the communication device and the target base station, and (b) compensating for the propagation delay by adjusting a time window at which the target base station receives transmissions from the communication device. An alternative embodiment of the invention provides a method operational on the base station which includes: (a) determining the propagation delay for transmission between the communication device and the target base station, and (b) compensating for the propagation delay by adjusting a time at which the communication device initiates transmissions to the target base station.

In another aspect, a base station may be configured to reduce the search space (search direction and/or frequency) in searching for communication devices. The base station may comprise: (a) a directional antenna to wirelessly communicate with a communication device, and (b) a processing unit communicatively coupled to the directional antenna. The processing unit may be configured to (a) search for a communication device pilot signal when the communication device indicates that a communication handoff to the base station should be initiated, (b) determine the direction of the communication device relative to the base station, (c) obtain a position of the communication device, (d) obtain a position of the base station, (e) calculate a direction of the communication device based on these two positions, (f) reduce the search space for the communication device by directing the directional antenna to a spatial sector in the direction of the communication device, (g) receive an indication that the communication device wants to handoff communications to the base station, (h) establish a communication link between the target base station and the communication device, and/or (i) adjust the direction of the directional antenna to account for movement of the communication device.

In a further aspect, a communication device that compensates for Doppler shift perceived at the receiving base station may comprise: (a) a communication interface to receive position information of the communication device, (b) a wireless interface to communicate with one or more base stations, (c) a global positioning system receiver communicatively coupled to the communication interface to receive the position information of the communication device, and/or (d) a processing unit communicatively coupled to the communication interface and the wireless interface.

The communication device of may be further configured to: (a) obtain the distance between the communication device and the base station, (b) determine a propagation delay for transmissions from the communication device to the base station, and (c) adjust the time at which the communication device initiates transmissions to the base station to compensate for the propagation delay.

The communication device may further include (a) a first antenna configured to operate as a directional antenna and communicatively coupled to the processing unit, and (b) a second antenna configured to operate as a directional antenna and communicatively coupled to the processing unit. The processing unit may be further configured to (a) establish a first communication link at a first carrier frequency with the base station via the first antenna, and (b) establish a second communication link at a second carrier frequency with a second base station via the second antenna. The communication device may be mounted on an aircraft and the communication device is a gateway for other communication devices to communicate through the base station.

In the above method and apparatus, a processor may be configured to control the method and/or functions of the apparatus. Similarly, a machine-readable medium may comprise instructions executable by a processor to perform the method and/or functions as described.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

In a communication system involving a wireless access terminal and a plurality of base stations, various schemes are provided that facilitate a communication handoff from a current base station to a target base station.

One feature provides for reducing the search space, including direction, frequency range, and/or search time, that a base station searches by using the position/location and/or velocity of the access terminal and/or base station. Having the position and/or velocity of the access terminal, a base station is able to reduce its search space (e.g., direction and/or frequency range) of a moving wireless access terminal. Adjusting the searched frequency range permits a receiving base station to compensate for Doppler shift that may be exhibited by moving access terminals, such as for example, an access terminal on aircraft. Alternatively, the access terminal may adjust or modulate its transmit frequency so that its transmissions arrive at the receiving base station at the expected frequency range. Another feature narrows the time offset search space in which a base station searches for signals from an access terminal.

Another feature provides for selectively and gradually increasing the power of a pilot signal originating from an access terminal during the handoff acquisition period to a target base station. By increasing the power of the pilot signal, a target base station has a better chance of acquiring the signal and do so more quickly than otherwise.

Figure 1:
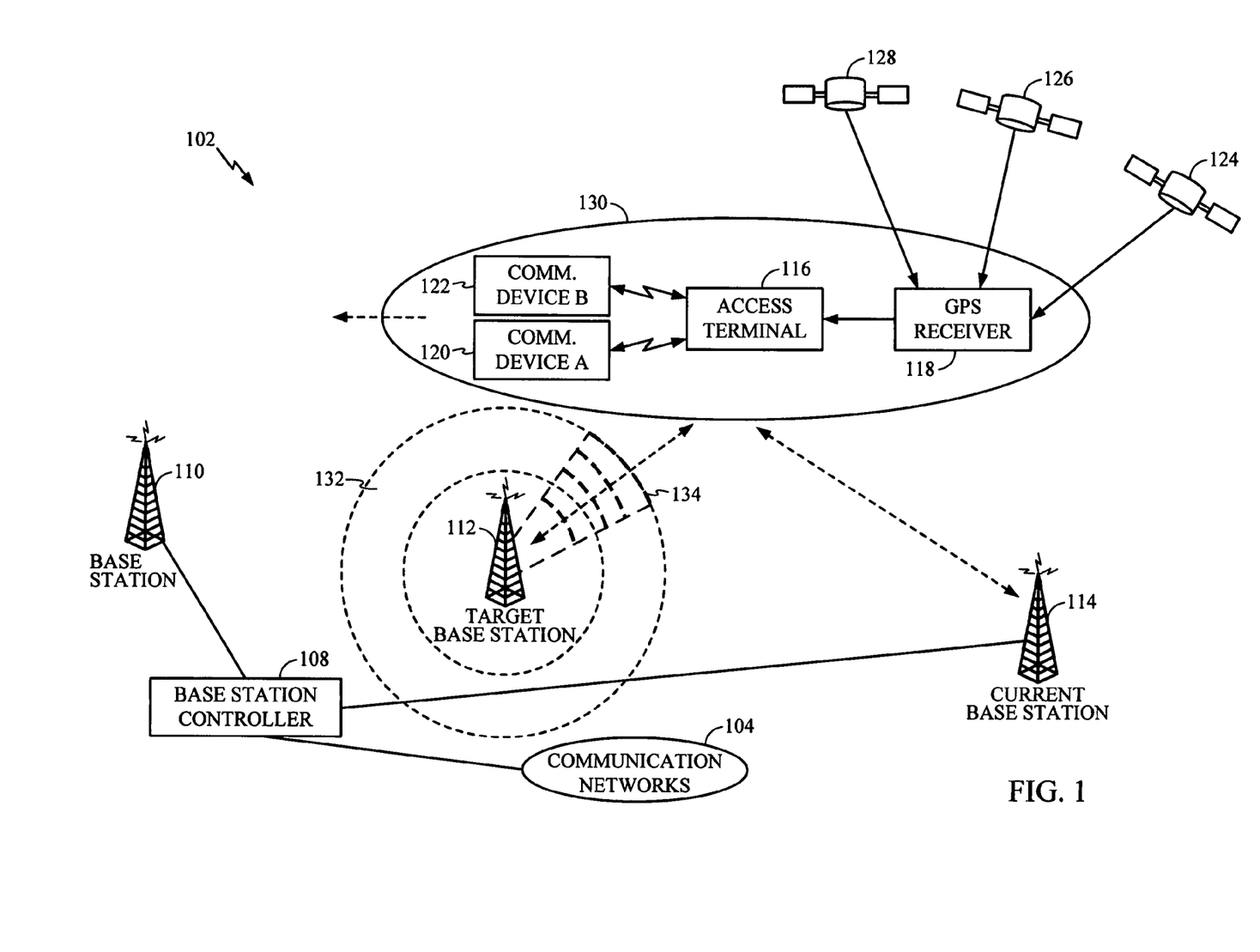
FIG. 1 an example wireless communication system that provides assisted acquisition during handoff.

FIG. 1 illustrates an example wireless communication system 102 that provides assisted acquisition during handoff of communication links. Communication system 102 includes a plurality of base stations 110, 112, and 114 communicatively coupled to a base station controller 108 which is communicatively coupled to other communication networks 104. This communication system permits one or more communication devices 120 and 122 to communicate with other communication devices through the base stations 110, 112, and 114 and/or communication networks 104.

An access terminal 116 may facilitate communications between one or more communication devices 120 and 122 and the various base stations of system 102 (e.g., base stations 110, 112, and 114). That is, the access terminal 116 allows communication devices 120 and 122 to communicate with other communication devices through the access terminal 116, base stations 110, 112, and 114, and/or communication networks 104. Access terminal 116 may include circuits or components (e.g., transmitters, receivers, antennas, etc.) that permit the access terminal 116 to receive, amplify, route, and/or retransmit communication signals to and/or from base stations 110, 112, and 114. Access terminal 116 may be implemented using one or more network/communication devices such as a gateway, repeater, relay, modem, and/or wired/wireless transceivers.

A global positioning system (GPS) receiver 118 may be communicatively coupled to either the communication device 120 or the access terminal 116. The GPS receiver 118 permits the access terminal 116 or communication devices 120 and 122 to provide its location to specified applications. In one example, GPS receiver 118 determines its position/location by using signals from one or more satellites 124, 126, and 128. While the system illustrated in FIG. 1 employs a plurality of satellites 124, 126, and 128, it should be recognized that various types of positioning systems that utilize a combination of satellites, and/or other terrestrial positioning system may be employed as well. Accordingly, the term "GPS" includes positioning or location determination by alternative positioning systems. By obtaining positioning signals from one or more GPS satellites 124, 126, and 128, GPS receiver 118 is able to accurately estimate or determine its position.

Communication device 120 may be a device capable of communicating through access terminal 116 in order to communicate with other communication devices. Communication device 120 may be a cellular telephone, a wireless device, a mobile device, a computer terminal, a personal digital assistant (PDA), and/or a mobile navigation system, among others. The communication link between communication devices 120 and 122 and access terminal 116 may be implemented using known wireless communication technologies.

Communication networks 104 may include a network over which voice, data, video and/or other signals are transmitted, including a public switch telephone network (PSTN), integrated services digital network (ISDN), public land mobile network (PLMN), circuit switched public data network (CSPDN), packet switched public data network (PSPDN), or other such network.

Base station controller 108 coordinates communication channels, processes, and provides base station to base station communications and access for communication devices 120 and 122, via access terminal 116, to other communication networks 104. The base station controller 108 may also provide resource allocation and mobility management functionality including, the orchestrating communication handoffs between the base stations 110, 112, and 114.

The functionality of the base station controller 108 and base stations 110, 112, 114, are shown in FIG. 1 as distributed. However, it is to be understood that the functionality of one or more of these components could likewise be centralized into a single module. Likewise, the functionality of some or all of access terminal 116, GPS 118, and communication device 120 may be combined into a single device. Various implementations have been described in conjunction with access terminal 116, GPS 118, and communication device 120 operatively associated with aircraft 130, but this is not a requirement and such components may alternatively be implemented in a hand-held or portable device, as well as implemented in other moving systems such as trains, vehicles, watercraft, and the like.

While wireless communication system 102 is shown having three base stations 110, 112, and 114, and one access terminal 116, it should be understood that there may be a number of base stations, each providing communications to a plurality of access terminals. Likewise, there may be a number of communication devices 120 and 122 in communication with access terminal 116.

In one implementation, the access terminal 116 is affixed or otherwise mounted to an aircraft 130 to permit communication devices 120 and 122 to communicate with other communication devices in aircraft 130, in other aircrafts, or on the ground.

In the example of FIG. 1, access terminal 116 is shown during a handoff process from currently serving base station 114 to target base station 112. That is, as access terminal 116 continues to communicate with current base station 114, target base station 112 attempts to acquire and establish a communication link with access terminal 116. When the communication handoff is successful, the access terminal 116 stops communicating with current base station 114 and starts communicating with target base station 112. Various implementations for assisting and improving the acquisition of a communication link by a target base station, such as target base station 112, are described herein.

On the forward link, modulated signals (e.g., data, pilot, and control signals, etc.) are transmitted from a base station to access terminal 116. These signals are subsequently received by access terminal 116, and portions of these received signals may be relayed to communication devices 120 and 122. On the reverse link, data, pilot, and/or control signals are transmitted by the access terminal 116 to a base station. Information transmitted by communication devices 120 and 122 to access terminal 116 may be transmitted by access terminal 116 in the reverse link to the current base station 114.

When the aircraft 130 is in flight, access terminal 116 moves in and out of the service areas of various base stations 110, 112, and 114. For example, FIG. 1 depicts access terminal 116 within the service area of current base station 114, and moving in the direction of the service area provided by target base station 112. In general, as the distance from a serving base station (e.g., current base station 114) increases, the communication link between access terminal 116 and the serving base station may degrade.

Various features of the present invention provide efficient ways of switching or handing off communications from a current base station 114 to a target base station 112, with minimal or no interruption in service. These features will be described in conjunction with a soft handoff of an access terminal, but such teachings apply equally to hard handoffs as well.

As access terminal 116 communicates with current base station 114, it travels around and may come within communication range of other base stations. Such other base stations may provide a better communications link than its existing link with current base station 114. There are a number of different techniques that access terminal 116 may use to search for or otherwise identify a better base station. For instance, access terminal 116 may monitor (e.g., continually, periodically, or sporadically) for pilot signals broadcasted by the base stations 110, 112, and 114 in wireless communication system 102 to determine which base station to select as the new serving base station or target base station. The target base station may be selected based on measurements of the pilot signal powers received from base stations 110, 112, and 114. In another example, the target base station may be selected based on a measure of signal quality such as, for example, signal-to-interference and noise ratio (SINR). Alternatively or additionally, access terminal 116 may select the target base station using the position location of itself, or the locations of base stations 110, 112, 114, or some combination thereof.

Regardless of the technique utilized to identify a better base station available, a handoff serves to transfer communications from a currently serving base station to a target base station. During a typical handoff, the communication link with the currently serving base station 114 is maintained to provide uninterrupted service, while a new communication link with target base station 112 is established.

One feature provides for reducing the search space, search direction, frequency range, and/or search time, that a base station searches by providing it with the position/location and/or velocity of the access terminal. Note that position and location may include information such as coordinates, longitude/latitude, spatial coordinates, angles and distances. When access terminal 116 transmits at a reduced or controlled amount of power, to minimize interference with other access terminals, it makes it more difficult for a target base station to perceive or detect its pilot signal. This makes the process of detecting signals from access terminals more difficult, particularly in the case where a base station searches in all directions to try to detect the signals. Moreover, signals transmitted from an airborne access terminal are likely to exhibit a Doppler shift in their frequency. That is, as a result of Doppler shift, a signal transmitted at a particular center frequency from a moving access terminal will arrive at a different center frequency at the receiving base station. Thus, a receiving base station, searching for the signals at their transmitted frequency, may have difficulty finding them. One solution is for the target base station 112 to search for transmitted signals from access terminal 116 at a wide range of frequencies or offsets. However, this makes it very time consuming to detect a pilot signal from access terminal 116. It is similarly time consuming for the base station 112 to search a large time window for signals from access terminal 116.

One solution to these problems is for the target base station 112 to limit its search space to a particular direction or sector 134, limit its search frequency offset to a narrow frequency range or Doppler shift offsets, and/or limit the time window in which the base station listens for transmissions from the access terminal. By focusing its search space to a sector 134 and limiting its search for signals to a subset of frequencies and/or time window, target base station 112 increases its probability of detecting the pilot signal from access terminal 116. Generally, for fixed levels of received pilot power and false detection probability, the probability of a successful pilot signal acquisition increases with a decreasing search space size. Additionally, the smaller the search space, the less complex and more efficient the searching process becomes. Because base station 114 knows the position of access terminal 116 as well as its own position, it can use a directional antenna to limit the direction in which to search for transmissions from access terminal 116. Moreover, access terminal 116 may implement a Doppler shift frequency correction to limit the frequency range searched for the expected signals from access terminal 116. In particular, since the base station 112 may obtain location (e.g., distance, direction, and/or coordinates) and velocity of travel for access terminal 116, it can estimate the Doppler shift of the transmitted frequency from the access terminal 116. By estimating the Doppler shift or frequency offset, the base station 114 can limit the frequencies searched. This is specially the case with air-borne access terminal 116 since there are likely to be no multipaths for the signals to base station 112. Therefore, the approximate frequency shift or offset can be determined.

Additionally, the base station may narrow the time window in which it listens for transmissions from access terminals. In some communication systems, such as CDMA2000-compliant systems, an access terminal has a particular time slot in which to communicate with its base station. This timeslot may be defined when communications between the access terminal and base station are setup. However, due to the delays in propagation and the displacement of an air-borne access terminal, the signals from the access terminal may not arrive at the base station at the expected time. Thus, the base station would have to broaden the time window in which it listens for transmissions from the access terminal. Since the base station 114 knows the approximate position of access terminal 116 it can calculate the approximate time of arrival of the access terminal's signal since such propagation time is proportional to the distance between access terminal 116 and base station 114. In particular, instead of listening for the arrival of signals from access terminal 116 over a broad time window, base station 114 can narrow this time window since it knows the approximate time of signal propagation from access terminal 116 to base station 114. Instead of having to search in a broad search window, (e.g., one thousand chips or a window wide enough such that the closest possible access terminal and the furthest possible access terminal would be included), base station 114 can narrow this window down (e.g., maybe ten chips or so) by taking into account the propagation delay distance access terminal 116. Reducing the search window may increase performance in the searching process.

In order for a base station to be able to focus on the correct search space (e.g., direction, frequency, and/or time), it has to know the approximate location of an access terminal. However, typical base stations do not know the location of the access terminals with which they communicate. For instance, a base station in a conventional wireless system typically does not know of the location of an access terminal with which it communicates or attempts to communicate. Consequently, such a conventional base station typically searches for the pilot signal of the access terminal over its entire search space 132 (e.g., in all directions and/or a wide frequency range). This is a time consuming process, made all the more difficult when an access terminal is affixed to a fast-moving object such as an aircraft.

According to one implementation, a communication handoff may be facilitated using various types of position-aiding information, such as the position and/or velocity of access terminal 116, the position of target base station 112, and/or the position of current base station 114, and the like. In other implementations, a suitably accurate search space may be determined or calculated without the use of such data.

According to one example, access terminal 116 may provide its position and/or velocity. For example, GPS receiver 118 can be used by access terminal 116 to determine an approximate position or location. The velocity of access terminal 116 may also be calculated using two or more position measurements of access terminal 116. In various embodiments, the calculations for generating a reduced search space for a base station may be performed at base station controller 108, current base station 114, target base station 112, some entity in communication with communication network 104, or some other entity.

During operation, access terminal 116 may communicate its position and/or velocity to an appropriate network entity such as base station controller 108. This communication may be accomplished by sending its position and/or velocity in the reverse link signal to current base station 114, which may then send this data to base station controller 108. The base station controller 108 may then forward the access terminal's position and/or velocity information to the target base station 112. To optimize the efficiency of the handoff, the position and/or velocity of access terminal 116 may be communicated prior to the initiation of the handoff process, contemporaneous with a handoff request, or shortly after the handoff process has been started.

Upon receiving the access terminal 116 position and/or velocity, target base station 112, having knowledge of its own position, location, and/or orientation, can determine or calculate the direction or sector to search. The access terminal 116 may then configure a directional antenna to focus on the calculated sector. Similarly, the target base station 112 can calculate the frequency offset, caused by the Doppler shift of the moving access terminal 116, to limit the searched frequencies.

In an alternative implementation, the base station controller 108 may obtain the access terminal 116 position and/or velocity and the location of target base station 112 to calculate the direction or sector to search. The base station controller 108 can then instruct the target base station 112 how to configure its directional antenna to point to the narrowed search space sector 134. The base station locations may be obtained from a base station controller 108, or from a database in communication with base station controller 108, or from other sources. Similarly, the base station controller 108 may calculate or estimate the expected frequency shift in signals from an access terminal and inform the base stations 112 and/or 114.

In yet another implementation, the access terminal 116 may calculate the direction or sector to search for the target base station 112 and/or the access terminal frequency offset or shift and send this information to the target base station 112 and/or current base station 114.

Target base station 112 may then use this information in searching for and acquiring pilot signals generated by access terminal 116. Since the search space, direction and/or frequency, for which target base station 112 searches for access terminal 116 has been reduced, by virtue of the calculated search space, base station 112 may acquire the pilot signal transmitted by access terminal 116 more quickly than would be possible if this information was not available to target base station 112.

Once the pilot signal from access terminal 116 has been successfully detected by the target base station 112, a signal is sent by the target base station 112 to access terminal 116 notifying it that its signal has been acquired. For example, target base station 112 may send such confirmation signal via base station controller 108 and current base station 114. Access terminal 116 can then switch communications from current base station 114 to target base station 112, and stop transmitting to current base station 114. This handoff process may be repeated as aircraft 130, and consequently access terminal 116, moves about the communication region of various other base stations of wireless communication system 102.

One feature provides for compensating frequency variations of signals between access terminal 116 and a base station. For example, as access terminal 116 moves away from current base station 114, the carrier frequency transmitted from the access terminal 116 to current base station 114 exhibits a Doppler shift. For instance, if aircraft 130, and thus access terminal 116, were not moving relative to target base station 112, then the carrier frequency of the signal of access terminal 116 would be substantially the same as that transmitted by target base station 112. However, since access terminal 116 may be implemented on a moving platform such as an aircraft 130, relative motion between access terminal 116 and current base station 114 (or target base station 112) during signal transmission is likely to occur. The relative motion between these entities typically causes a Doppler shift or frequency offset in the reverse link signal received at current base station 114 (or target base station 112). This is the case even if the access terminal 116 transmitted at the same frequency as the current base station 114. This causes the received nominal frequency at the current base station 114 to be shifted, making it difficult for the current base station 114 to detect it. Such Doppler shift makes it more difficult for current base station 114 (or target base station 112) to lock in on the carrier frequency of the access terminal 116. That is, base stations are typically configured to receive signals on a particular frequency range. When the carrier frequency varies from the expected nominal frequency, a base station has difficulty in acquiring the signal. In the present invention, the frequency range may be shifted to allow for Doppler shifts or the access terminal 116 may correct for the Doppler shift prior to transmission.

In one embodiment of the invention, the receiving base station 112 may determine the Doppler shift or frequency offset based on two position measurements of the access terminal 116 and then adjust its own receiver to compensate for the frequency shift. Having the base station 112 perform the frequency offset compensation (e.g., searching at the compensated frequency) may be easier than having the access terminal 116 change and/or modulate its signal transmissions to compensate for Doppler shift.

In another embodiment of the invention, the access terminal 116 can compensate for a Doppler shift by knowing its velocity relative to the base station 112 with which it communicates. As described above, access terminal 116 can determine its velocity by using GPS receiver 118 to determine two or more locations and calculating a velocity from the time transpired between locations. Other ways of determining the relative velocity between an access terminal and a receiving base station may also be employed.

One or more base station locations may be stored in a database associated with access terminal 116. This database may include the positions of the various base stations within wireless communication system 102. During operation, access terminal 116 may identify a base station by an identifier (e.g., Base ID) broadcasted by the base station as part of a base station pilot signal. Access terminal 116 may obtain the position of these base stations by searching the database using the Base ID. Alternatively, the positions of a base station may be obtained from a remote source, such as from base station controller 108, or some other entity. For example, base station controller 108 may obtain the position of a desired base station from a suitable source (e.g., a database or by contacting the identified base station), and then send this information to access terminal 116 via a forward link signal through current base station 114. This base station location information may be requested by access terminal 116, and provided by base station controller 108 or some other entity. Alternatively, the base station location information (e.g., location information for specific base stations or base stations in the vicinity of access terminal 116) may be communicated to access terminal 116 on a periodic or ongoing basis.

Regardless of the source of the base station location information, once access terminal 116 has received a base station location information it can utilize this location information to determine the sector or direction in which it should transmit or receive (e.g., using a directional antenna). Additionally, in some implementations, the either the transmitting access terminal 116 or receiving base station 114 may calculate a frequency correction offset or coefficient to compensate for a Doppler shift in the reverse link carrier frequency perceived by the receiving base station 114. For example, access terminal 116 may use its velocity and the target base station 112 position information to calculate the carrier frequency that target base station 112 would perceive. Thus, access terminal 116 may modify its carrier frequency of the signals transmitted by access terminal 116 so that these signals arrive at target base station 112 (or current base station 114) within a substantially nominal center frequency. This change in carrier frequency may be used to compensate for the undesirable Doppler shift in the signal generated by access terminal 116. Because the signal from access terminal 116 is received at target base station 112 at or about the nominal center frequency, target base station 112 does not have to perform a broad, and time consuming, frequency domain search for signals generated by access terminal 116.

Alternatively, the receiving base station 114, having knowledge of the access terminal 116 velocity, can adjust its receiver, by shifting the searched frequency, to compensate for the Doppler shift exhibited by the signals transmitted by the access terminal 116. Accordingly, target base station 112 may acquire access terminal 116 more quickly than would be possible if adjustments for the Doppler shift of the access terminal 116 signal was not performed.

As access terminal 116 travels from one place to another, its current base station may adjust its frequency offset correction to compensate for Doppler shift. For instance, if access terminal 116 moves towards, and then away from, current base station 114, its perceived Doppler shift may gradually change. To compensate for this gradual change, base station 114 may monitor the access terminal's velocity and/or position relative to current base station 114 continuously, periodically, or as needed, and adjusts its directional antenna to point to the correct sector at the correct frequency offset.

Similarly, the time offset correction may be implemented at either the base station or the access terminal. In one embodiment, base station 114 can narrow the time window in which to listen for transmissions from access terminal 116 since it knows the approximate time of signal propagation from access terminal 116 to base station 114. In another embodiment, access terminal 116, knowing its displacement and distance from base station 114, can calculate the propagation delay to base station 114 and compensate for it by initiating its transmissions early. That is, access terminal 116 can adjust the time in which it initiates its transmission periods so that the transmission are received at base station 114 at the expect time.

Note that the carrier frequency compensation described herein may be employed with both a current base station and/or a target base station. Access terminal 116 may be optionally configured with two or more directional antennas, and corresponding two or more frequency generation devices (e.g., voltage controlled oscillators). During operation, a first directional antenna may direct a first signal toward current base station 114, and a second directional antenna directs a second signal toward target base station 112. This is possible since access terminal 116 has knowledge of the relative positions of access terminal 116, target base station 112, and current base station 114. Access terminal 116 may use this information along with its velocity information to calculate a Doppler shift-compensated carrier frequency that the receiving base stations would perceive as having the expected nominal carrier frequency. That is, access terminal 116 may transmit a Doppler shift-compensated carrier frequency over the first directional antenna to the current base station 114 that is received by the current base station 114 at the expected nominal carrier frequency. Similarly, access terminal 116 may also transmit a Doppler shift-compensated carrier frequency over the second directional antenna towards target base station 112 so that it arrives at target base station 112 at or about the expected nominal center frequency. Note that, in most instances, having the access terminal 116 compensate or modulate its transmit frequency is impractical. Thus, having the base stations 114 and/or 116 adjust their received frequency may be a better solution in some instances.

In accordance with yet another implementation, a communication handoff may be facilitated by both reducing the search space and compensating a Doppler shift in the carrier frequency, as described above. This may be accomplished using either a single antenna/receiver or multiple antennas/receivers.

Figure 2:
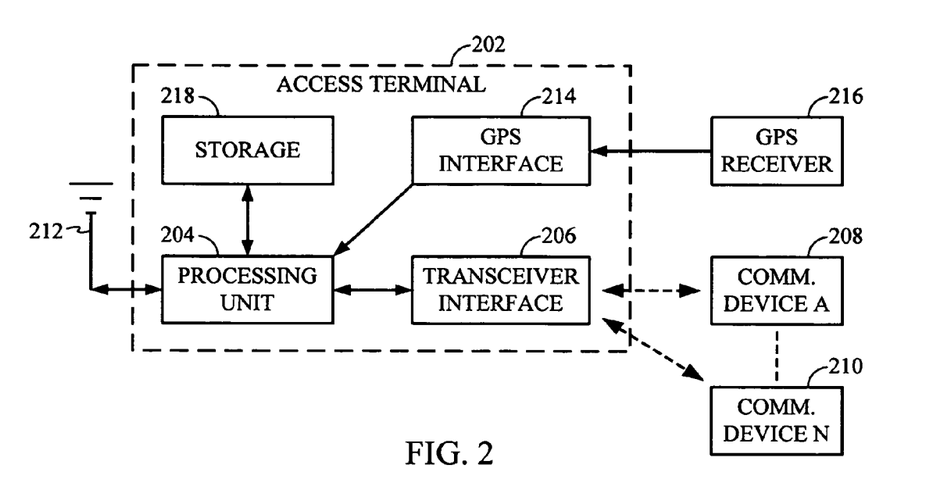
FIG. 2 is an example access terminal according to one implementation.

FIG. 2 is an example access terminal 202 including a processing unit 204 to manage communications to/from base stations and/or communication devices. A transceiver interface 206 may provide a wireless link to one or more local communication devices 208 and 210 (e.g., mobile phones, computers, etc.). The processing unit 204 may also be communicatively coupled to an antenna 212 to enable the access terminal 202 to communicate with one or more base stations. A GPS interface 214 is coupled to the processing unit 204 and allows the processing unit to receive information from a GPS receiver 216. In this manner, the processing unit 204 may obtain position/location information for the access terminal 202. Additionally, the processing unit 204 may be coupled to a storage device 218 to store position/location information for the access terminal 202, position/location information for base stations, and/or manage communication stacks for communications to/from the communication devices 208 and 210.

The access terminal 202 may be configured to assist in reducing the search space of a base station, reducing the frequency offset searched by the receiving base station, compensate for Doppler shift in its transmitted carrier frequency and/or a received carrier frequency, and/or perform selective and gradual adjustment of its pilot power during a handoff. Thus, access terminal 202 may be configured to operate as described in FIGS. 1, 4, 5, and 6. Note that one or more components or functions of the access terminal 202 may be combined into a single component or divided into multiple components without deviating from the invention.

Figure 3:
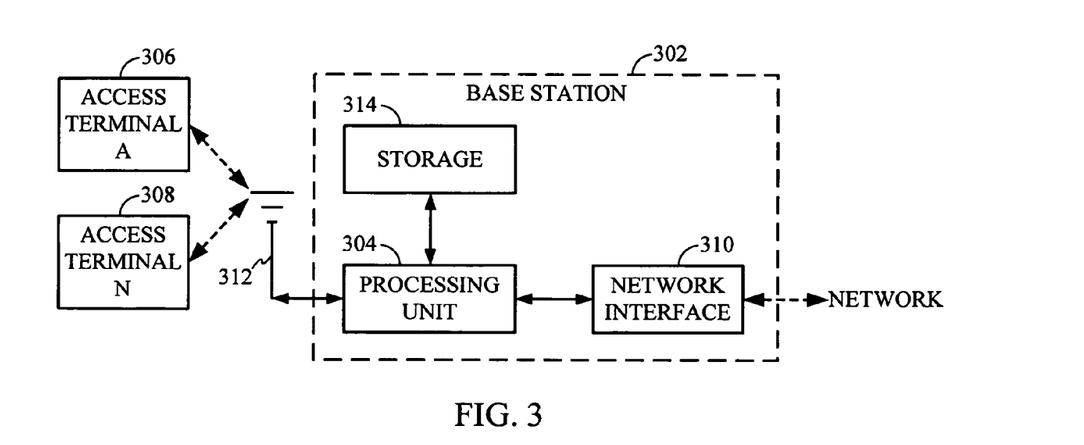
FIG. 3 is an example base station according to one implementation.

FIG. 3 is an example base station 302 including a processing unit 304 to manage communications to/from a base station network and/or access terminals 306 and 308. A network interface 310 may provide a communication link to a communication network, a base station controller, or other base stations. Processing unit 304 may also be communicatively coupled to an antenna 312 to enable the base station 302 to communicate with one or more access terminals 306 and 308. A storage device 314 may store position/location information for base station 302, position/location information for access terminals, and/or manage communication stacks for communications to/from the access terminals 306 and 308.

Base station 302 may be configured to reduce its search space during a handoff from an access terminal and assist access terminals 306 and 308 in compensating for a Doppler shift, and/or assist in performing a selective and gradual adjustment of access terminal pilot signal power during a handoff. Thus, base station 302 may be configured to operate as described in FIGS. 1, 4, 5, and 6. Note that one or more components or functions of the base station 302 may be combined into a single component or divided into multiple components without deviating from the invention.

Figure 4:
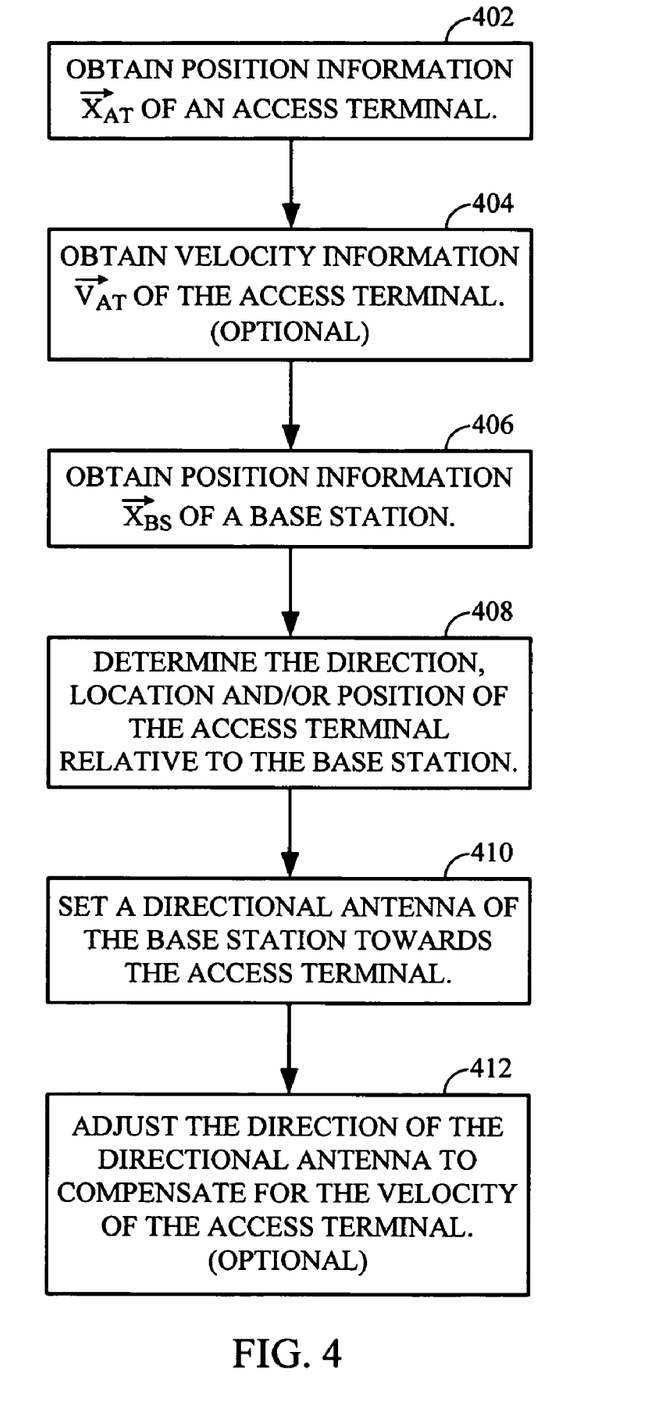
FIG. 4 is an example method for narrowing a search space of a receiving base station to more efficiently acquire a signal from a transmitting access terminal.

FIG. 4 illustrates an example method for narrowing a search space or direction of a receiving base station to more efficiently acquire a signal from a transmitting access terminal. Access terminal position or location $\vec{X}_{AT}$ is obtained 402. This may be accomplished by an access terminal using a GPS receiver or from one or more different sources. Optionally, the velocity $\vec{V}_{AT}$ of the access terminal may also be obtained or calculated 404. For example, the velocity $\vec{V}_{AT}$ of the access terminal may be calculated by taking the difference between two positions over a period of time. The position $\vec{X}_{BS}$ of the receiving base station is obtained 406. Generally, base stations are fixed (e.g., not moving) and so their location or position $\vec{X}_{BS}$ is known. For instance, a base station location database may be coupled to a base station controller to provide such base station location. Alternatively, a base station may be configured to store its own location information and retrieve such information when needed. Having the locations of the access terminal and the base station, a direction (e.g., in three dimensional space) relative to the orientation of the base station can be determined 408. This direction permits pointing 410 a directional antenna of the base station towards the access terminal.

Additionally, if an access terminal velocity is provided or determined (e.g., from two or more positions over a known period of time), then the base station may be able to adjust 412 the direction of its directional antenna as the access terminal moves.

Figure 5:
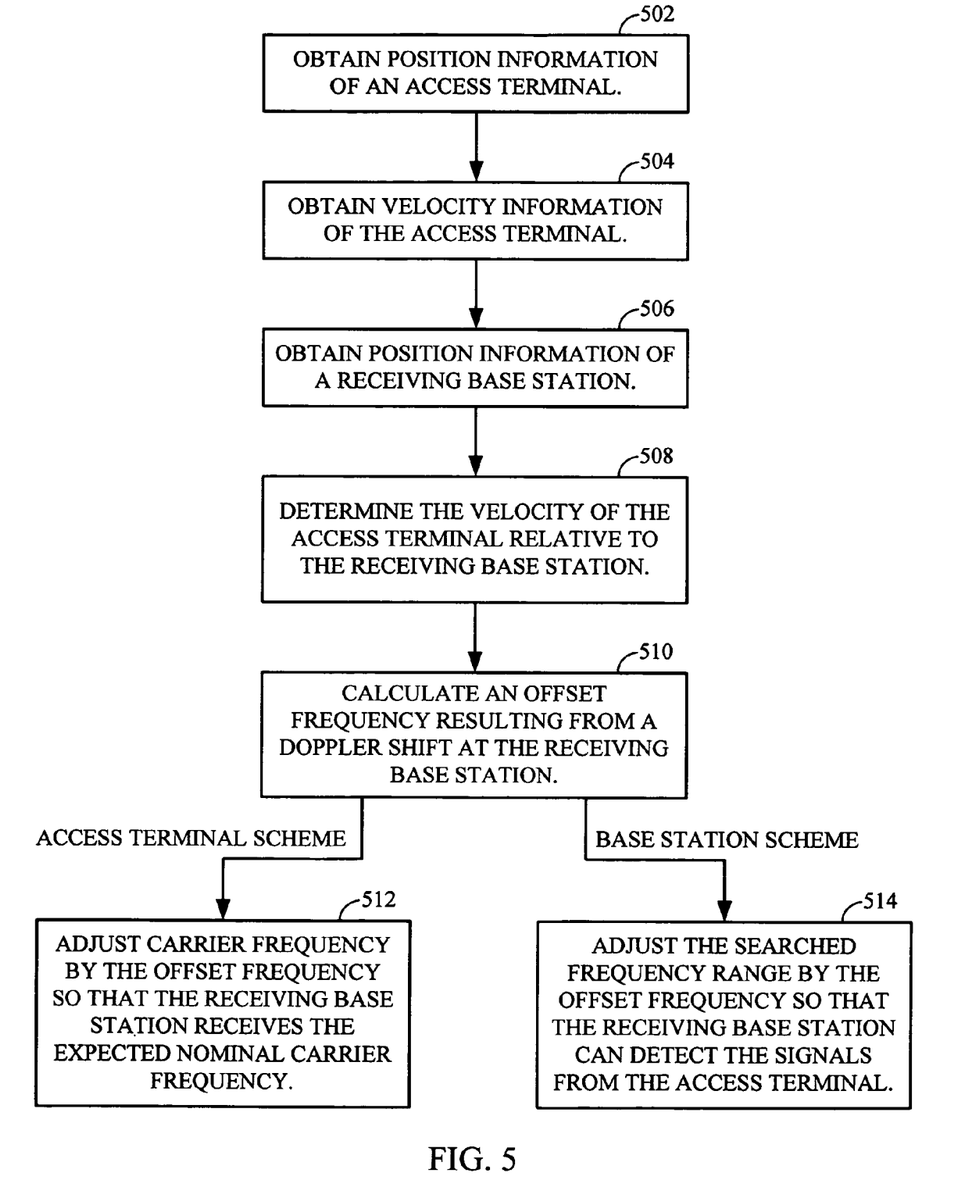
FIG. 5 is an example method for correcting the carrier frequency for a Doppler shift caused by the relative speeds of an access terminal and a receiving base station.

FIG. 5 illustrates an example method for correcting the carrier frequency for a Doppler shift caused by the relative speeds of an access terminal and a receiving base station. As previously noted, the movement of the access terminal relative to its receiving base station causes a Doppler shift in the perceived frequency at the receiving base station. As a result, the receiving base station receives a carrier frequency that is offset from the expected nominal center frequency, making it difficult to acquire the signal from the access terminal. One solution provides for obtaining 502, 504 position information of an access terminal and its velocity. This position may include longitude, latitude, and/or three-dimensional coordinates. The position of the receiving base station is then obtained or retrieved 506. Since receiving base stations are typically in a fixed position, the velocity of the access terminal relative to the receiving base station can then be determined 508. This relative velocity may be the velocity vector of the access terminal that is directly to, or away from, the base station or otherwise contributes to the Doppler shift. From the relative velocity between access terminal and base station, the offset frequency resulting from a Doppler shift of the carrier frequency perceived by the receiving base station can be calculated 510. In a first embodiment, this offset frequency can then be used to adjust 512 the carrier frequency transmitted by the access terminal so that the receiving base station receives the expected nominal carrier frequency. In an alternative embodiment, the receiving base station can adjust 514 its searched frequency range so that the receiving base station can detect the signals from the access terminal. In this manner, Doppler shifts can be compensated. In various implementations, this frequency shift may be determined by an access terminal, a base station, a base station controller, or another device.

Figure 6:
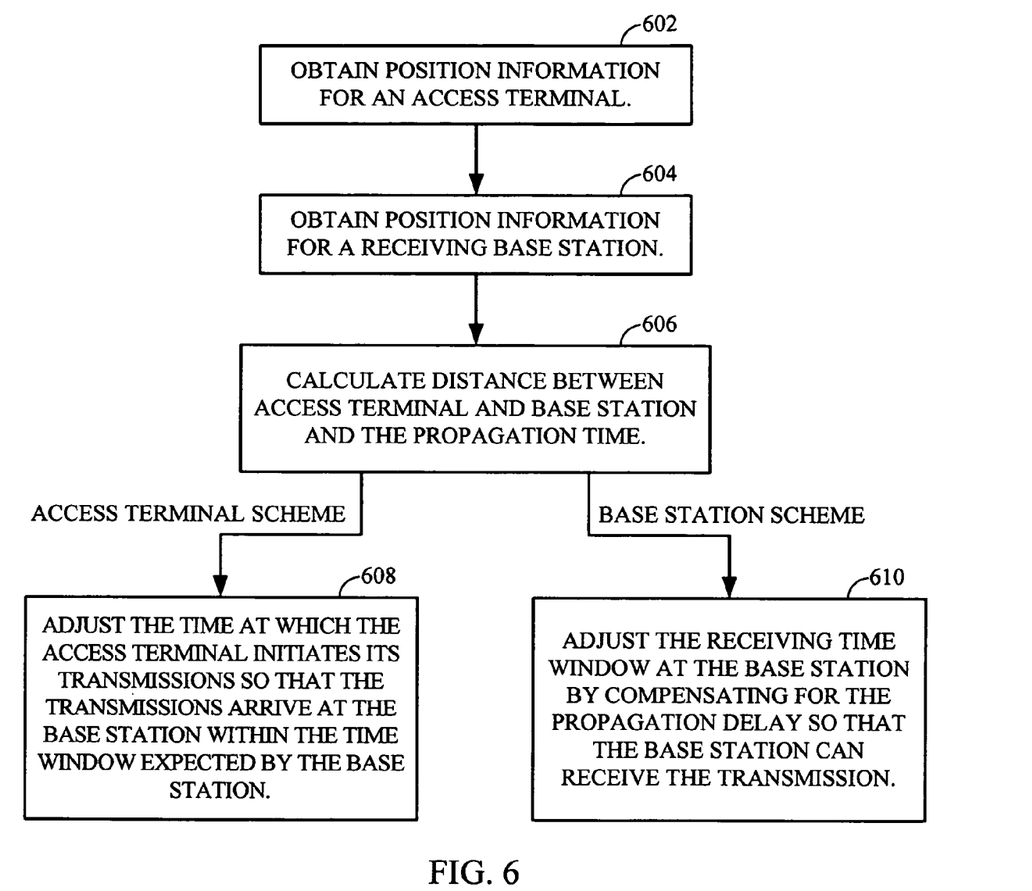
FIG. 6 is an example method for compensating for the propagation delay between an access terminal and a receiving base station.

FIG. 6 illustrates an example method for compensating for the propagation delay between an access terminal and a receiving base station. As previously noted, the distance and movement of the access terminal relative to the base station causes a changing propagation delay in transmissions to the receiving base station. As a result, the receiving base station may receive transmissions from the access terminal outside the expected time window. One solution provides for obtaining 602 position information of an access terminal. This position may include longitude, latitude, and/or three-dimensional coordinates. The position of the receiving base station is then obtained or retrieved 604. The two positions can then be used to determine 606 a distance between the access terminal and receiving base station, as well as the propagation delay. In one implementation, the access terminal may then adjust 608 the time at which it initiates its transmissions so that the transmissions arrive at the base station within the time window expected by the base station. In an alternative embodiment, the base station adjusts or shifts 610 its receiving time window by compensating for the propagation delay so that the base station can receive the transmission.

Another feature provides for a method of adjusting transmission power during a communications handoff. In a CDMA uplink, an access terminal typically transmits both data and pilot symbols at the same time using different codes. An access terminal may transmit its data and pilot signals at a reduced power level in order to minimize interference with other systems. The choice of the relative power between data and pilot signal transmissions is a delicate one. Transmitting too much pilot signal power results in a waste of power and channel capacity while transmitting too little pilot power degrades the channel and results in a reduced spectral efficiency.

In a typical system, the acquisition of a pilot signal during a handoff is done using the existing pilot power levels. That is, the access terminal transmits it pilot signal at the same power level as its current data-bearing signal with its current base station. However, such levels may be too low when communicating with a target base station trying to acquire the pilot signal from the access terminal. Depending on various factors (e.g., distance, number of other devices in the vicinity, number of devices in communication, etc.), the pilot signal power necessary to reliably communicate with a target base station will vary.

One solution to this problem is to selectively and gradually increase the access terminal's pilot power during the handoff acquisition period. It is better to suffer a momentary degradation in spectral efficiency than to fail to handoff all together. The amount of power allocated to the access terminal's pilot signal is gradually and selectively increased until the acquisition is completed, the total power reaches a maximum allowed transmit power, or some other terminating condition has been reached.

Figure 7:
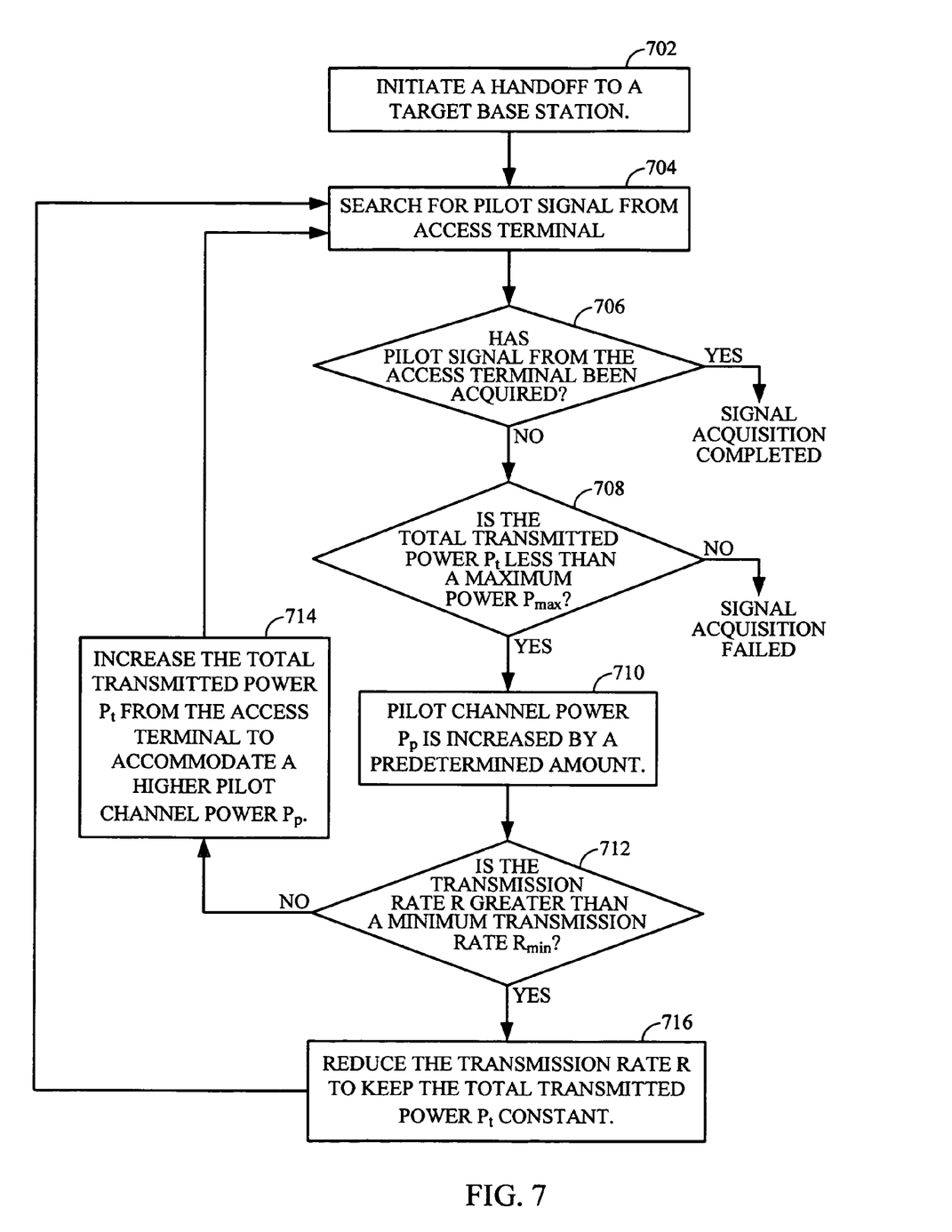
FIG. 7 is an example method for selectively and gradually increasing an access terminal's pilot signal power during the handoff acquisition period.

FIG. 7 illustrates an example method for selectively and gradually increasing an access terminal's pilot signal power during the handoff acquisition period. The total transmitted power $P_t$ of an access terminal includes the sum of the pilot channel power $P_p$, the data channels power, and the overhead channel power. A communication handoff to a target base station is initiated 702 when an access terminal has identified a suitable target base station. The access terminal may identify the suitable target base station through pilot signals broadcasted by base stations. Through its communication link with its current base station the access terminal can notify the target base station of its desire to handoff. The target base station can then search 704 for the access terminal's pilot signal. The access terminal determines 706 if the target base station has acquired its pilot signal. If the access terminal does not receive notification of a successful acquisition by the target base station after a period of time, it assumes that the pilot signal has not been acquired. The access terminal then checks 708 to determine if its total transmitted power $P_t$ is less than a maximum power $P_{max}$. If so, the pilot channel power $P_p$ is increased by a predetermined amount 710. If the data transmission rate R is greater than a minimum data transmission rate $R_{min}$ 712, then the data transmission rate R is decreased 716 to keep the total transmitted power at a level similar to the one before starting the handoff. This helps to prevent excessive interference to other users. When the data transmission rate R reaches the minimum rate allowed, the access terminal increases 714 the total power to accommodate a higher pilot channel power. This process is repeated until the pilot signal from the access terminal is acquired by the target base station or a maximum total transmission power has been reached.

Once a signal has been acquired by a base station, the total transmitted power, pilot channel power, and data transmission rate may be reduced or adjusted based on commands from the acquiring base station.

Note that the parameter $R_{min}$ provides significant flexibility. Setting this parameter to the smallest rate (which can be zero) protects other access terminals operating within the wireless communication system since the total power $P_t$ is less likely to increase. However, setting $R_{min}$ to the data rate that the access terminal was transmitting before starting the handoff process protects the data communication of the access terminal since it does not sacrifice the data channel power in order to increase the pilot channel power $P_p$.

In certain communication systems, the access terminal's transmission power may be controlled through power control commands from a base station. The base station may send an "UP" command to indicate that the access terminal should increase its transmit power, and a "DOWN" command to indicate that it should decrease its transmit power. The access terminal may typically comply with these power control commands since they ensure that the received power level is appropriate in order to achieve some quality of service for the access terminal, while minimizing the interference caused to other users. The base station typically performs some type of energy estimation on the received pilot signal from an access terminal to determine the appropriate power control commands.

During a handoff procedure in accordance with FIG. 7, the access terminal breaks the power control loop (e.g., ignores power control commands) by increasing the pilot power without being commanded to do so by the base station. With conventional control mechanisms disabled, it is possible that some or all of the access terminal packets could be decoded in error by a target base station because there is not sufficient power in the data channels for the particular data rate being transmitted. However, some systems implement fast acknowledgement signals, like IS-856 Revision A. In such a system, the base station may send a bit or symbol to the access terminal indicating whether a transmitted packet was decoded successfully (ACK), or whether the packet was not decoded successfully (NACK). This provides the access terminal with an ability to find out the adequate data rate to transmit. The access terminal can therefore choose the data rate that results in the desired packet error rate (PER).

Accordingly, tracking the PER at the access terminal can be easily achieved using the ACK/NACK bit coming from the base station.

In accordance with one implementation of the present invention, the apparatuses of FIGS. 2 and/or 3 may be implemented in conjunction with one or more of the embodiments disclosed in FIGS. 1, 4, 5, 6 and 7. For instance, the method of FIG. 6 may be implemented in conjunction with the reduction of the search space (e.g. direction, carrier frequency offset adjustment, and/or receiving time window). In such implementations, the increase in pilot power may be implemented if the access terminal's transmitted signal could not be acquired by the target base station despite either the reduction in the search space of the target base station, and/or by reducing the frequency domain that the target base station needs to search for the access terminal signal.

It should be noted that the apparatus, devices, and/or components illustrated in FIGS. 1, 2, and/or 3 may be configured to perform one or more of the methods, features, or steps described in FIGS. 4, 5, 6 and/or 7. Also, various other means can be implemented to perform one or more of the methods, features, or steps described in FIGS. 4, 5, 6 and/or 7.

Figure 8:
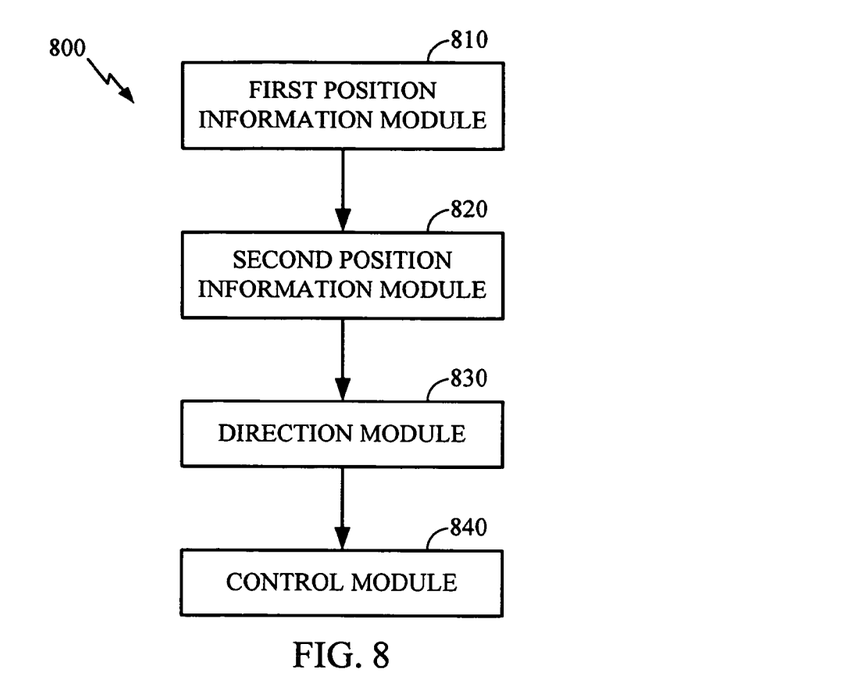
FIGS. 8-10 are example apparatus for use in communication handoff.

For example, FIG. 8 illustrates an example apparatus 800 for communications handoff. Apparatus 800 comprises first position information module 810 configured to obtain position information of a communication device, a second position information module 820 configured to obtain position information of a target base station attempting to acquire a signal from the communication device; a direction module 830 configure to determine a direction of the communication device relative to the target base station; and control module 840 configured to direct a directional antenna of the target base station in the direction of the communication device to reduce the search space for the signal from the communication device.

Figure 9:
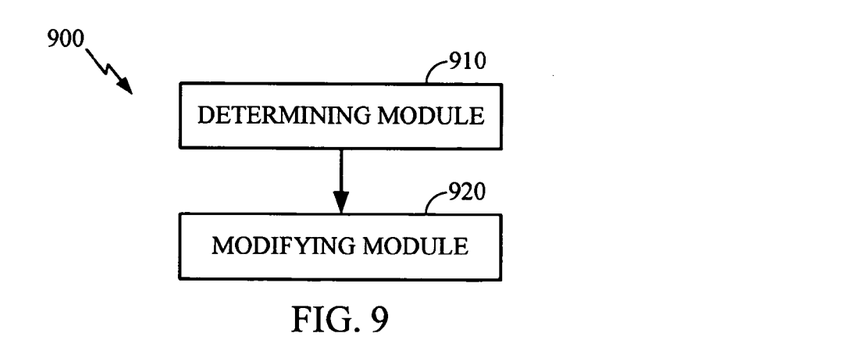

FIG. 9 illustrates an example apparatus 900 for use in compensating for a Doppler shift in a carrier frequency. Apparatus 900 comprises a determining module 910 configured to determine a perceived carrier frequency of a communication device at a receiving base station; and a modifying module 920 configured to modify the transmitted carrier frequency of the communication device so that it arrives at the receiving base station at an expected nominal carrier frequency.

Figure 10:
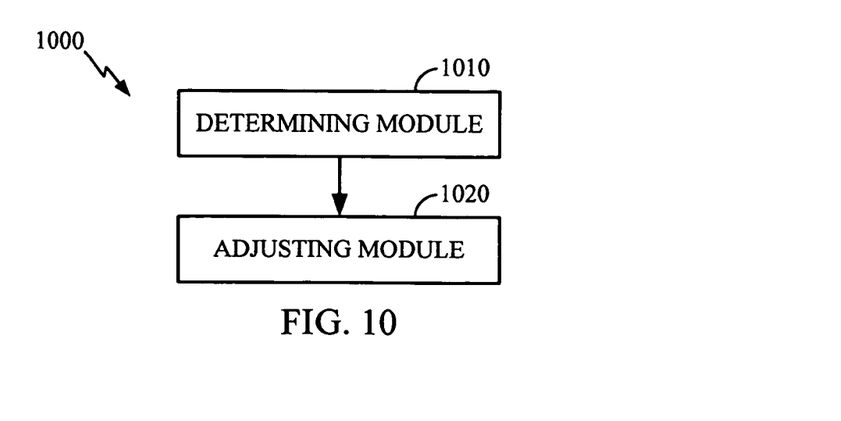

FIG. 10 illustrates another example apparatus 1000 for use in compensating for a Doppler shift in a carrier frequency. Apparatus 1000 comprises a determining module 1010 configured to determine a perceived carrier frequency of a communication device at a receiving base station; and an adjusting module 1020 configured to adjust a frequency range searched by the receiving base station to compensate for the frequency shift in the signal received from the communication device.

One or more of the components, steps, and/or functions illustrated in FIGS. 1, 2, 3, 4, 5, 6, 7, 8, 9 and/or 10 may be rearranged and/or combined into a single component, step, or function or embodied in several components, steps, or functions without departing from the invention. Additional elements, components, steps, and/or functions may also be added without departing from the invention.

Therefore, the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A computer-implemented method for communications handoff, the computer-implemented method comprising:
   obtaining position information of a communication device;
   obtaining position information of a target base station attempting to acquire a signal from the communication device;
   calculating a direction of the communication device relative to the target base station;
   directing a directional antenna of the target base station in the direction of the communication device;
   determining a perceived carrier frequency of the communication device at the target base station;
   adjusting a searched frequency of the target base station to compensate for a frequency shift resulting from a Doppler shift of a transmitted carrier frequency from the communication device;
   increasing a pilot channel power of the communication device if the communication device is not acquired by the target base station after a time period; and
   reducing a transmission rate of the communication device wherein a total transmitted power of the communication device after increasing the pilot channel power is maintained at a value substantially equal to a total transmitted power of the communication device prior to commencing the communications handoff.

2. The computer-implemented method of claim 1, further comprising:
   determining if a communication handoff from a current base station to the target base station is warranted;
   acquiring the signal from the communication device;
   establishing a communication link between the target base station and the communication device; and
   terminating a communication link between the current base station and the communication device.

3. The computer-implemented method of claim 1, wherein the communication device is an access terminal mounted on an aircraft.

4. The computer-implemented method of claim 1, further comprising:
   obtaining a velocity of the communication device relative to the target base station.

5. The computer-implemented method of claim 4, further comprising:
   adjusting the direction of the directional antenna to account for displacement of the communication device.

6. The computer-implemented method of claim 1, wherein the obtaining position information of the communication device comprises:
   determining the position of the communication device based upon calculations performed by a global positioning system receiver operatively associated with the communication device.

7. The computer-implemented method of claim 1, further comprising:
   determining a velocity of the communication device relative to the target base station; and
   modifying a transmitted carrier frequency of the communication device wherein the transmitted carrier frequency arrives at the target base station at an expected nominal carrier frequency.

8. The computer-implemented method of claim 1, further comprising:
   determining a propagation delay for transmission between the communication device and the target base station; and compensating for the propagation delay by adjusting a time at which the target base station recieves transmissions from the communication device.

9. The computer-implemented method of claim 1, further comprising:
   determining the propagation delay for transmission between the communication device and the target base station; and
   compensating for the propagation delay by adjusting a time at which the communication device initiates transmissions to the target base station.

10. The computer-implemented method of claim 1, wherein the signal from the communication device is a pilot signal transmitted over a pilot channel.

11. The computer-implemented method of claim 1, wherein the increasing the pilot channel power of the communication device is performed if the total transmit power of the communication device prior to commencing the communications handoff is less than a maximum total transmit power.

12. The computer-implemented method of claim 1, further comprising increasing the total transmit power of the communication device by an amount that is substantially equal to an increased pilot channel power the transmission rate from the communication device is less than or equal to a minimum transmission rate.

13. A base station comprising:
   a directional antenna configured to wirelessly communicate with a communication device; and
   a processing unit communicatively coupled to the directional antenna and configured to:
      search for a communication device pilot signal if the communication device indicates that a communication handoff to the base station should be initiated;
      direct the directional antenna to a spatial sector in a direction of the communication device;
      obtain a velocity of the communication device;
      determine a frequency shift in signals transmitted from the communication device as perceived by the base station;
      adjust a searched frequency range to compensate for the frequency shift in the signals transmitted from the communication device;
      increase a pilot channel power of the communication device if the communication device is not acquired by the base station after a time period; and
      reduce a transmission rate of the communication device wherein a total transmitted power of the communication device after increasing the pilot channel power is maintained at a value approximately equal to a total transmitted power of the communication device prior to initiating the communication handoff.

14. The base station of claim 13, wherein the processing unit is further configured to:
   determine the direction of the communication device relative to the base station.

15. The base station of claim 14, wherein the processing unit is further configured to:
   obtain a position of the communication device;
   obtain a position of the base station; and
   determine a direction of the communication device based on the position of the communication device and the position of the base station.

16. The base station of claim 13, further comprising:
   a network interface configured to communicate with other base stations, the network interface communicatively coupled to the processing unit, wherein the processing unit is further configured to receive the direction of the communication device relative to the base station over the network interface.

17. The base station of claim 13, wherein the processing unit is further configured to:
   adjust a direction of the directional antenna for accounting for movement of the communication device.

18. The base station of claim 13, wherein the processing unit is further configured to:
   obtain a distance between the communication device and the base station;
   determine a propagation delay for transmissions from the communication device to the base station; and
   adjust a base station receiving time window to compensate for the propagation delay for transmissions from the communication device.

19. A non-transitory machine-readable medium storing instructions executable by a processor for reducing a search space during communications handoff, the machine-readable medium comprising:
   instructions for obtaining position information for a communication device initiating the communications handoff;
   instructions for obtaining position information for a base station attempting to acquire a signal from the communication device;
   instructions for calculating a direction of the communication device relative to the base station;
   instructions for directing a directional antenna of the base station in the direction of the communication device to reduce the search space;
   instructions for obtaining a velocity of the communication device;
   instructions for determining a frequency shift in signals transmitted from the communication device as perceived by the base station;
   instructions for adjusting a searched frequency range to compensate for the frequency shift in the signals transmitted from the communication device;
   instructions for increasing a pilot channel power of the communication device if the communication device is not acquired by the base station after a time period; and
   instructions for reducing a transmission rate of the communication device wherein a total transmitted power of the communication device after increasing the pilot channel power is maintained at a value similar to that of a total transmitted power of the communication device prior to commencing the communications handoff.

20. An apparatus for communications handoff, the apparatus comprising:
   means for obtaining position information of a communication device;
   means for obtaining position information of a target base station attempting to acquire a signal from the communication device;
   means for determining a direction of the communication device relative to the target base station;
   means for directing a directional antenna of the target base station in the direction of the communication device for reducing a search space for the signal from the communication device;
   means for obtaining a velocity of the communication device;

means for determining a frequency shift in signals transmitted from the communication device as perceived by the base station;

means for adjusting a searched frequency range to compensate for the frequency shift in the signals transmitted from the communication device;

means for increasing a pilot channel power of the communication device if the communication device is not acquired by the target base station after a time period; and means for reducing a transmission rate of the communication device wherein a total transmitted power of the communication device after increasing the pilot channel power is maintained at a value substantially equal to a total transmitted power of the communication device prior to commencing the communications handoff.

* * * * *